(12) United States Patent
Makhlouf et al.

(10) Patent No.: US 9,078,220 B2
(45) Date of Patent: Jul. 7, 2015

(54) METHOD AND APPARATUS FOR UE POWER CLASS ADAPTION FOR COVERAGE EXTENSION IN LTE

(71) Applicant: MOTOROLA SOLUTIONS, INC, Schaumburg, IL (US)

(72) Inventors: Isam R Makhlouf, Lake Zurich, IL (US); Michael H Baker, Elmhurst, IL (US); Edgar P Fernandes, Winchester (GB); Xiaowei Jin, Inverness, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/039,848

(22) Filed: Sep. 27, 2013

(65) Prior Publication Data

US 2015/0092670 A1    Apr. 2, 2015

(51) Int. Cl.
*H04W 4/00*    (2009.01)
*H04W 52/26*    (2009.01)

(52) U.S. Cl.
CPC .................................. *H04W 52/265* (2013.01)

(58) Field of Classification Search
CPC .................................................... H04W 52/24
USPC ........... 370/252–253, 242; 455/507–522, 422
See application file for complete search history.

(56) References Cited

U.S. PATENT DOCUMENTS

| 8,359,060 | B2 | 1/2013 | Odigie et al. |
| 2010/0255868 | A1 | 10/2010 | Lee et al. |
| 2011/0143800 | A1 | 6/2011 | Han et al. |
| 2012/0270536 | A1 | 10/2012 | Ratasuk et al. |
| 2013/0051261 | A1 | 2/2013 | Kazmi et al. |
| 2013/0130752 | A1* | 5/2013 | Zhang et al. ................. 455/574 |
| 2013/0143616 | A1 | 6/2013 | Han et al. |
| 2013/0223235 | A1* | 8/2013 | Hu et al. ...................... 370/242 |
| 2014/0092823 | A1* | 4/2014 | Song et al. .................... 370/329 |

FOREIGN PATENT DOCUMENTS

| EP | 2501186 A1 | 9/2012 |
| WO | 2013025236 A1 | 2/2013 |
| WO | 2013/141791 A1 | 9/2013 |

OTHER PUBLICATIONS

International Search report mailed Sep. 15, 2014 counterpart of PCT/US2014/055601.
EADS: "Name Change of HPUE Power Class", 3GPP Draft: R4-130139_CR_36837_Powerclassrename, (3GPP) Mobile Competence Centre; vol. RAN WG4, no. St. Julian: 20130128-20130201. Jan. 21, 2013, XP050672677, URL: http://www.3gpp.org/ftp/tsg_ran/WG4_Radio/TSG_66/Docs/.

* cited by examiner

*Primary Examiner* — Iqbal Zaidi
(74) *Attorney, Agent, or Firm* — Daniel R. Bestor (57) ABSTRACT

A method and apparatus for User Equipment (UE) power class adaptation for coverage extension in Long Term Evolution (LTE) includes setting a maximum transmit power to a predefined level that is below a maximum capability of a high power UE (HPUE); responsive to determining, based on detected operating conditions local to the HPUE, that an increase in transmit range is required, raising the maximum transmit power towards or to the maximum capability of the HPUE; and subsequently transmitting at an operating transmit power at or below the maximum transmit power as a function of the detected operating conditions local to the HPUE. The method and apparatus allow the HPUE to infer how to configure its maximum power to mitigate interference to the same class of cells, without assistance from an Evolved Node B (eNB) and within the existing 3GPP LTE framework.

17 Claims, 5 Drawing Sheets

METHOD AND APPARATUS FOR UE POWER CLASS ADAPTION FOR COVERAGE EXTENSION IN LTE

BACKGROUND OF THE INVENTION

The present disclosure relates generally to wireless networking such as Long Term Evolution (LTE) systems. The 3rd Generation Partnership Project (3GPP) specifies User Equipment (UE) power classes in 3GPP TS 36.101 Technical Specification Group Radio Access Network; Evolved Universal Terrestrial Radio Access (E-UTRA); User Equipment (UE) radio transmission and reception (Release 8 (December 2008), Release 9 (December 2009), Release 10 (March 2011), Release 11 (September 2012), and Release 12 (ongoing)), the contents of which are incorporated by reference herein. A higher power class with 31 dBm (1.2 W) has recently been introduced to 3GPP TS 36.101 v11.3.0 (February 2013), i.e. power class 1 for E-UTRA band 14. This power class complements the existing 23 dBm power class 3 UE currently defined in the 3GPP standard. The main motivation behind this higher power class is range extension in rural deployments, as the LTE link budget is typically uplink limited in noise-limited environments. However, a High Power UE (HPUE) can also enhance coverage in suburban and urban areas, especially indoor, in tunnels and in parking garages, due to terrain, etc. This higher power class today is for vehicular modems, but it is expected to evolve to mobile devices and the like.

Disadvantageously, there are Uplink (UL) interference concerns if HPUEs are deployed in areas where the evolved Node B (eNB) density was designed for 23 dBm power class UE coverage. Following conventional 3GPP open loop UE power control behavior, an HPUE will reach max power well before it is necessary from a range extension perspective thereby improving throughput for that device, but increasing UL interference noise rise and degrading UL performance overall from a system perspective. LTE is typically deployed with a frequency reuse of one, similar to code division multiple access (CDMA), where the same frequency bands are used in every cell, and thus, while the HPUE is advantageous for range extension, it can cause problematic interference when used for increased throughput.

As the primary intent behind the HPUE was for range extension, not increased throughput, a mechanism is needed to limit UE transmit power such that higher power (more than, for example, 23 dBm) is utilized only to extend range/coverage, not to increase throughput, so that the benefit of HPUE can still be utilized in poor coverage spots (indoor/tunnels, etc.) in urban/suburban areas without causing unnecessary UL interference. Accordingly, there is a need for a method and apparatus for UE power class adaptation for coverage extension in LTE.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment, a method for User Equipment (UE) power class adaptation for coverage extension in Long Term Evolution (LTE) includes setting a maximum transmit power to a predefined level that is below a maximum capability of a high power UE (HPUE); responsive to determining, based on detected operating conditions local to the HPUE, that an increase in transmit range is required, raising the maximum transmit power towards or to the maximum capability of the HPUE; and subsequently transmitting at an operating transmit power at or below the maximum transmit power as a function of the detected operating conditions local to the HPUE.

In another exemplary embodiment, an apparatus for User Equipment (UE) power class adaptation for coverage extension in Long Term Evolution (LTE) includes a radio configured to operate in a plurality of power classes; a processor communicatively coupled to the radio; and memory storing instructions that, when executed, cause the processor to: set a maximum transmit power to a predefined level that is below a maximum capability of the radio; responsive to determining, based on detected operating conditions local to the apparatus, that an increase in transmit range is required, raise the maximum transmit power towards or to the maximum capability of the radio; and subsequently transmit at an operating transmit power at or below the maximum transmit power as a function of the detected operating conditions local to the apparatus In yet another exemplary embodiment, a Long Term Evolution (LTE) system for User Equipment (UE) power class adaptation for coverage extension includes an Evolved Node B (eNB); and a High power UE (HPUE) communicatively coupled to the eNB; wherein the HPUE is configured to: set a maximum transmit power to a predefined level that is below a maximum capability of the HPUE; responsive to determining, based on detected operating conditions local to the HPUE and with signaling information from the eNB, that an increase in transmit range is required, raise the maximum transmit power towards or to the maximum capability of the HPUE; and subsequently transmit at an operating transmit power at or below the maximum transmit power as a function of the detected operating conditions local to the HPUE without assistance from the eNB.

In various exemplary embodiments, a method and apparatus for UE power class adaptation for coverage extension in LTE is described. The method and apparatus enable a UE to infer how to configure its maximum power to mitigate interference to the same class of cells, without assistance from the eNB and within the existing 3GPP LTE framework. Stated differently, the method and apparatus focus increased power solely for range extension as opposed to increased throughput while operating within existing open loop power control methodologies in LTE. The method and apparatus provide mechanisms to limit high power except when needed for range extension while focusing such mechanisms at UEs and incorporating the mechanisms into the existing 3GPP LTE framework thereby requiring no modifications at eNBs or the like. Thus, the method and apparatus can interoperate with existing, deployed LTE systems.

In an exemplary embodiment, a UE (e.g., an HPUE) artificially limits its maximum transmit power ($P_{CMAX}$) to a predefined level (e.g., 23 dBm) that is below the maximum capability of the UE hardware (e.g., 31 dBm) and/or below the eNB $P_{max}$ broadcast value. Further, the UE infers if open loop power control is in an operating region wherein MCS (Modulation and Coding Scheme) allocation is at or below some minimal level, RB (Resource Block) allocation is at or below some level, and a transmit buffer is not emptied with each transmission. The UE then adjusts $P_{CMAX}$ between the predefined limit and the max UE hardware capability until BLER (Block Error Rate) returns to a typical operating point and RB allocation increases.

Figure 1:
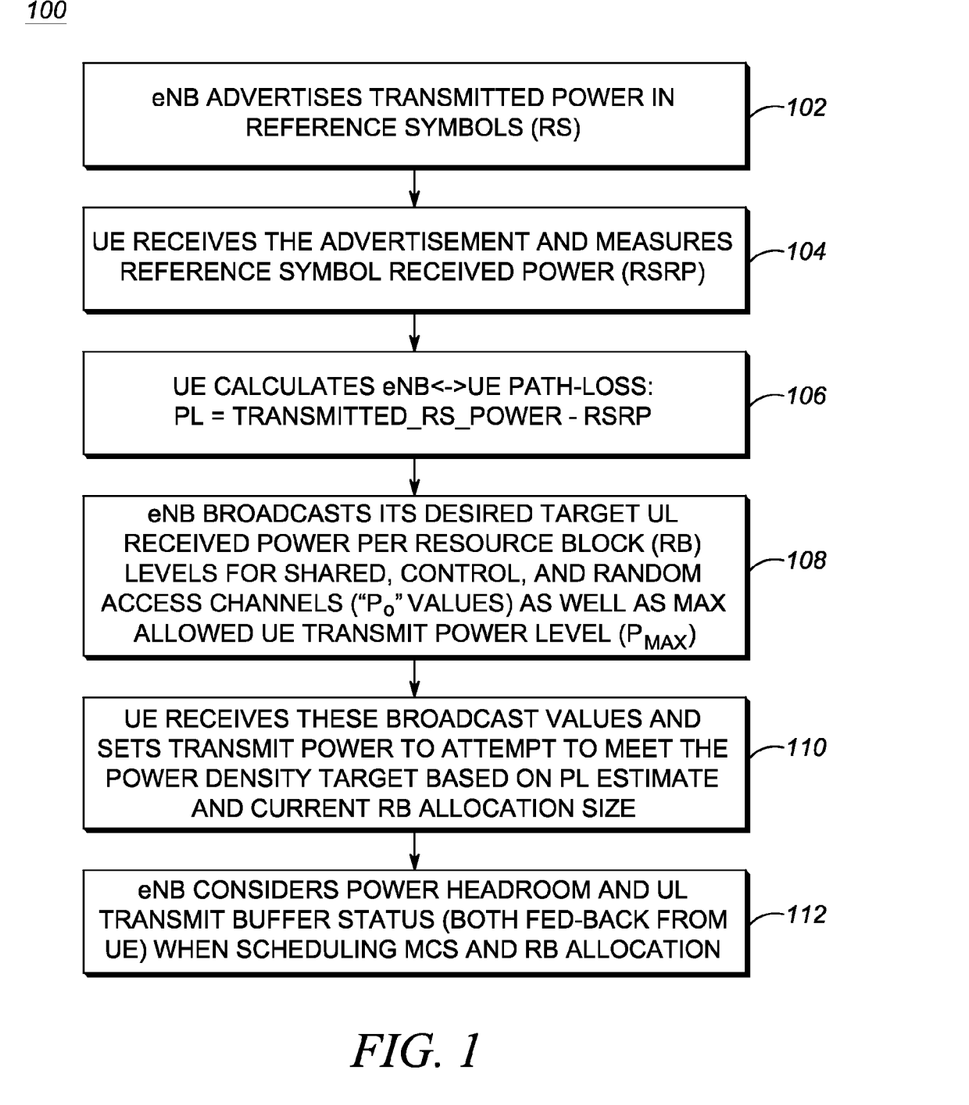
FIG. 1 is a flowchart of an open-loop UE power control method in LTE in accordance with some embodiments

FIG. 1 is a flowchart of an open-loop UE power control method 100 in LTE in accordance with some embodiments. The open-loop UE power control method 100 is operated between a UE and an eNB. The UE can include, without limitation, a mobile device, an access terminal, a digital radio, a laptop, a tablet, a net-book, a smart phone, or the like. The eNB is an Evolved Node B, (abbreviated as eNodeB or eNB) which is the element in E-UTRA of LTE that is the evolution of the element Node B in UTRA of UMTS. The eNB is the hardware that is connected to the mobile phone network that communicates directly with UEs, like a base transceiver station (BTS) in GSM network.

In the open-loop UE power control method 100, the eNB advertises transmitted power in reference symbols (RS) (step 102). A UE receives the advertisement and measures reference symbol received power (RSRP) (step 104). From the receive advertisement, the UE calculates eNB<->UE path-loss: PL=Transmitted_RS_power−RSRP (step 106). The eNB broadcasts its desired target UL received power per resource block (RB) levels for shared, control, and random access channels ("$P_o$" values) as well as max allowed UE transmit power level ($P_{max}$) (step 108). The UE receives these broadcast values and sets transmit power to attempt to meet the power density target based on PL estimate and current RB allocation size (step 110). The eNB considers power headroom and UL transmit buffer status (both fed-back from UE) when scheduling modulation and coding scheme (MCS) and RB allocation (step 112).

The open-loop power control equation is as follows, Power for Physical uplink shared channel (PUSCH):

$$P_{PUSCH}(i)=\min\{P_{CMAX}, 10\log_{10}(M_{PUSCH}(i))+ P_{O\_PUSCH}(j)+a(j)\cdot PL+\Delta_{TF}(i)+f(i)\}$$

where $P_{CMAX}$ is the configured maximum UE transmit power, i.e. Min(max_power_capability, $P_{MAX}$), $M_{PUSCH}$ is the RB allocation size, $P_{O\_PUSCH}$ is the eNB broadcast power target, $\alpha$ is the fractional pathloss compensation factor, PL is the path loss estimate, $\Delta_{TF}$ is an MCS offset defined by higher layers, and f is an accumulation factor defined by higher layers.

The method and apparatus propose operating the open-loop UE power control method 100 while artificially limiting a UE's maximum transmit power ($P_{CMAX}$). This method and apparatus is needed to limit UE transmit power such that higher power (than, for example, 23 dBm) is utilized only to extend range/coverage, not to increase throughput, so that the benefit of HPUE can still be utilized in poor coverage spots (indoor/tunnels, etc.) in urban/suburban area without causing unnecessary UL interference. Specifically, the eNB sees a UE's headroom that is reported relative to the modified $P_{CMAX}$. The proposed method and apparatus manipulates $P_{CMAX}$ at the UE such that $P_{CMAX}$ is only raised when it is determined locally that the UE needs more power for range, not for throughput. That is, the UE is limiting its maximum power, and the eNB does not know the absolute power level the UE is transmitting at; the eNB only knows the power headroom. Thus, the UE changes $P_{CMAX}$ and the eNB only knows the power headroom. Thus, the method and apparatus are compatible with existing power controls through the eNB.

Figure 2:
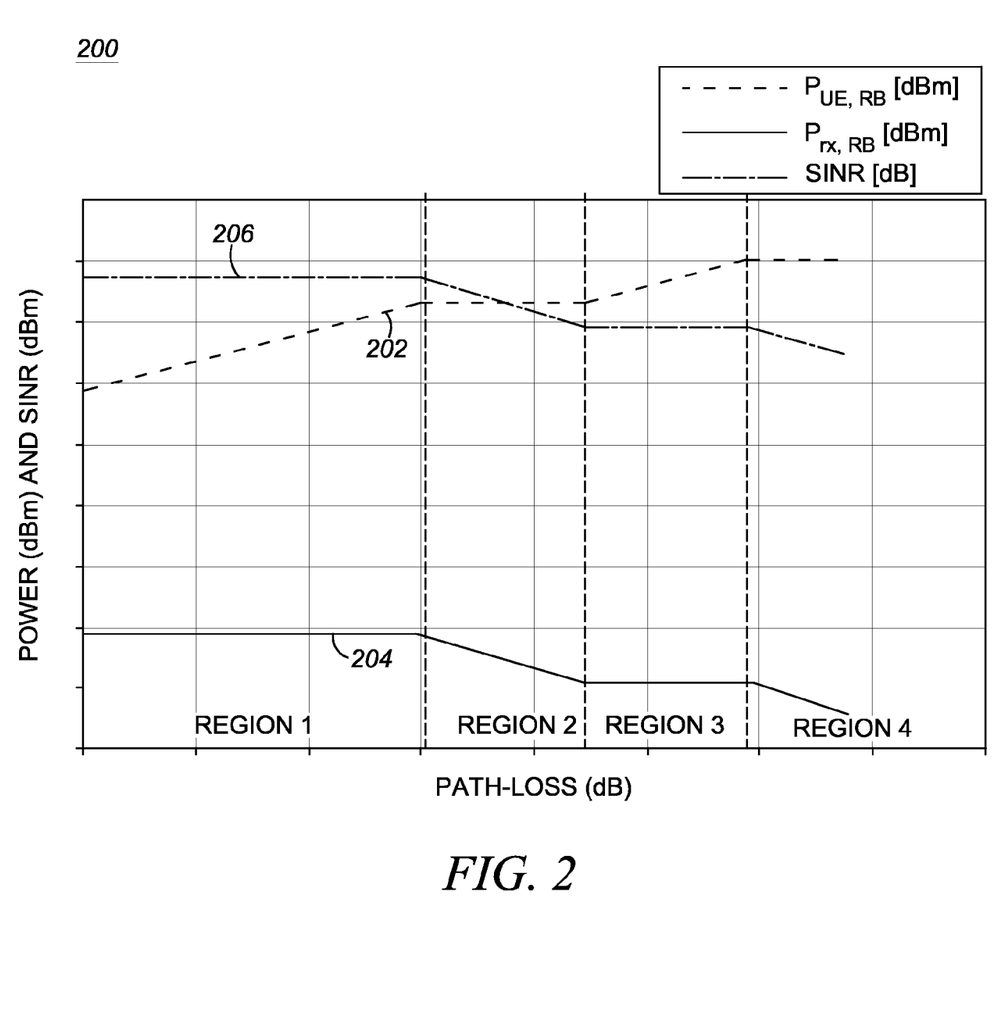
FIG. 2 is a graph of open-loop power control behavior in accordance with some embodiments.

FIG. 2 is a graph of open-loop power control behavior 200 in accordance with some embodiments. In particular, the open-loop power control behavior 200 illustrates interaction between UE open-loop power control behavior and an eNB scheduler. The open-loop power control behavior 200 is used to determine locally at the UE that higher power is needed for range extension. That is, the open-loop power control behavior 200 illustrates various regions 1, 2, 3, 4 of operation as path-loss (dB) increases between the UE and the eNB. From the associated operating parameters, the UE can infer it needs range extension as is described herein. The open-loop power control behavior 200 is used to allow the UE to solely decide higher power is needed for range extension without involvement of the eNB in the process. The regions 1, 2, 3, 4 were determined to characterize the operating behavior of a UE as it extends range. That is, the regions 1, 2, 3, 4 are not standardized LTE terms, but characterizations of operation that enable the UE to locally determine it needs more power for range extension, not increased throughput.

The graph in FIG. 2 includes three lines 202, 204, 206 showing dB or dBm versus path-loss in dB. The line 202 is power each UE transmits per resource block ($P_{UE,RB}$ in dBm), and as expected the line 202 increases as the path-loss increases. The line 204 is the power the eNB receives from the UE per resource block ($P_{rx,RB}$ in dBm), and again as expected, the line 204 decreases at the path-loss increases. Finally, the line 206 is SNR in dB which decreases as the path-loss increases. These behaviors are as expected as the path-loss increases between the UE and eNB.

In region 1, the UE has full RB (bandwidth) allocation, the highest Modulation Coding Scheme (MCS), and the UE transmit power gradually increases to maximum as the path-loss increases in region 1. In region 2, the UE is at full transmit power, full RB allocation, and the MCS is gradually reduced to a minimal level (e.g. MCS 5) as the path-loss increases in region 2. In region 3, the UE is at full transmit power, the MCS is at a minimal level, and RB allocation is gradually reduced to a minimal level (e.g. 1 RB) as the path-loss increases in region 3. Finally, in region 4, the UE is at full transmit power, the RB allocation is at a minimal level, and the MCS allocation can be reduced further (e.g., MCS 5 to MCS 0) and/or Block Error Rate (BLER) begins to increase above target level until link is lost as the path-loss increases in region 4.

Thus, the open-loop power control behavior 200 can be characterized as increase in UE transmit power in region 1 to a full transmit power, decrease in MCS in region 2, reduction of RB allocation in region 3, and further reduction in MCS and/or BLER increase in region 4. In region 4, the UE has no further options to account for increased path-loss to meet the target received power at eNB. Thus, the method and apparatus is meant to limit the HPUE to increased power (e.g., greater than 23 dBm) in region 4 to try and get the HPUE to operate around the border of regions 3 and 4. Of note, the operating characteristics of the open-loop power control behavior 200 are able to be determined locally at the HPUE thereby removing any changes in the eNB. For example, the UE is aware of its MCS and RB allocation each Transmission Time Interval (TTI) in which it receives an allocation. Note that in alternate embodiments, the behaviors of each region illustrated in FIG. 2 may occur in a different order and the number of regions may be different, but the alternate embodiments share the fact that in the final region the UE has no further options to account for increased path-loss to meet the target received power at eNB.

Figure 3:
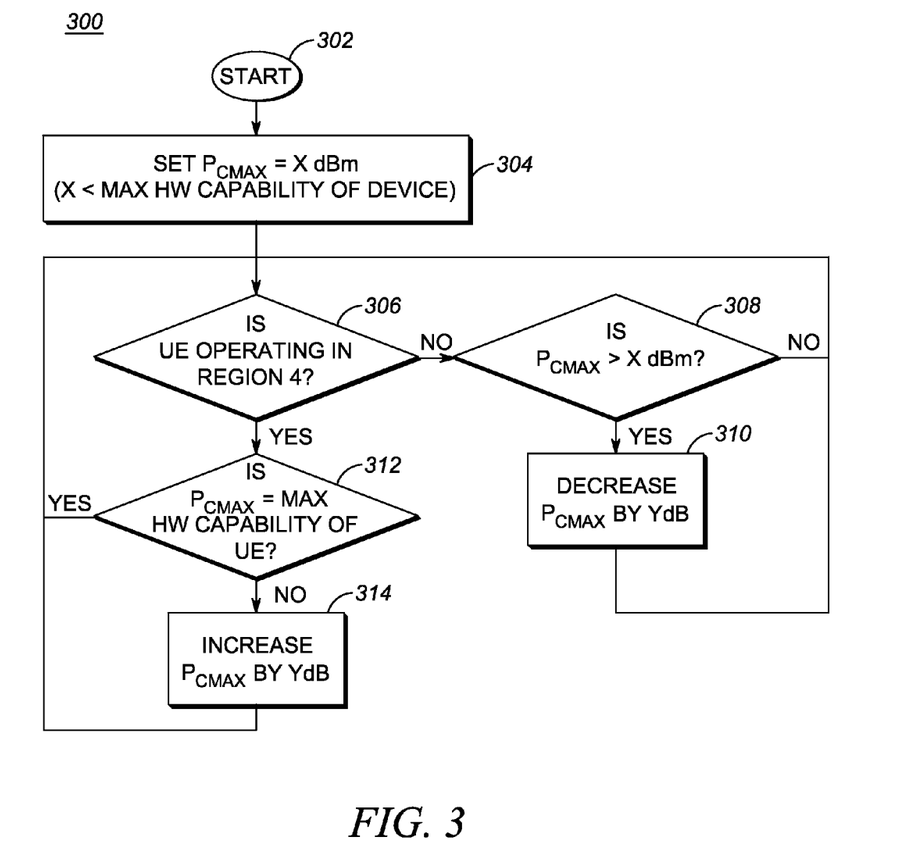
FIG. 3 is a flowchart of a method for UE power class adaptation for coverage extension in LTE in accordance with some embodiments.

FIG. 3 is a flowchart of a method 300 for UE power class adaptation for coverage extension in LTE in accordance with some embodiments. The method 300 has the UE artificially limits its maximum transmit power ($P_{CMAX}$) to a predefined level (e.g., 23 dBm) that is below the max capability of the UE hardware (e.g., 31 dBm) and/or below the eNB $P_{max}$ broadcast value. Power headroom is reported to an associated eNB relative to this reduced $P_{CMAX}$. The UE infers if open loop power control is in operating "region" 4 if BLER is above an expected or recent target (e.g., 10%) and all or some of the following conditions are met: Transmit buffer is not emptied with each transmission (indicates RB allocation is not limited due to data buffer size); Power headroom report is 0 dB relative to the current PCMAX configuration (indicates region >1); MCS allocation is at or below some minimal level, e.g. MCS 5 (indicates region >2); and RB allocation is at or below some level, e.g. 2 RBs or (indicates region >3).

Thus, the UE makes a local determination that it is in region 4 without involvement of the eNB. If the UE infers that it is operating in region 4, it adjusts $P_{CMAX}$ between the predefined limit and the max UE hardware capability until BLER returns to the typical operating point and RB allocation increases. Note, the Power headroom is reported to the eNB relative to the increased $P_{CMAX}$. Again, the eNB does not know the absolute power level a UE is transmitting at; rather, the eNB only knows the power headroom. So, the UE changes the $P_{CMAX}$, eNB only knows the headroom, making the method 300 implementable with existing 3GPP LTE standards and deployed eNBs.

Figure 4:
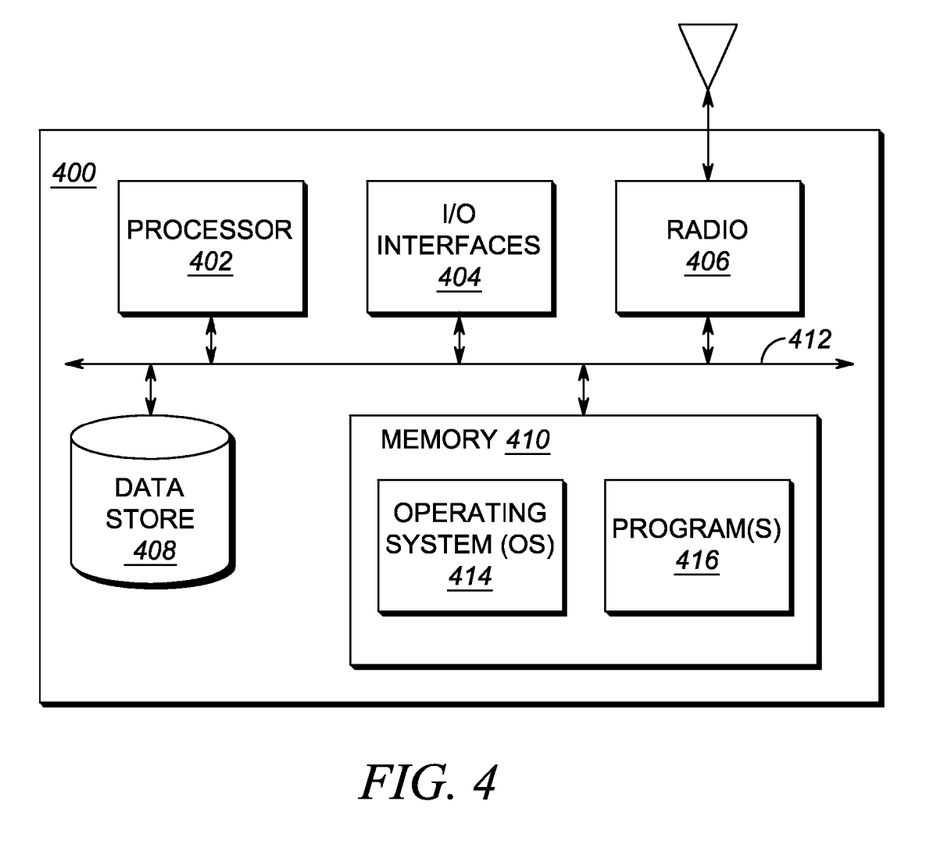
FIG. 4 is a block diagram of a HPUE apparatus for UE power class adaptation for coverage extension in LTE in accordance with some embodiments.

The method 300 is implemented in an HPUE, such as the HPUE illustrated, for example, in FIG. 4. The method 300 starts at step 302. The method 300 can operate on an on-going basis as long as the HPUE is operating. Initially, the method 300 sets the maximum transmit power ($P_{CMAX}$) of the HPUE to a value, X dBm, where X is less than the maximum hardware capability of the HPUE (step 304). For example, X can be 23 dBm, and the maximum hardware capability of the HPUE can be 31 dBm, although other values are also contemplated as the power class standards evolve in LTE.

The method 300 checks if the HPUE is operating in region 4 (step 306). Here, the method 300 infers the operational mode based on the open-loop power control behavior 200 described herein. For example, the HPUE can infer it is in region 4 based on a BLER above a predetermined level (e.g., 10%), failure to empty the transmit buffer with each transmission thereby indicating RB allocation is not limited due to data buffer size, the power headroom report is 0 dB relative to the current $P_{CMAX}$ configuration, the MCS allocation from the eNB is at or below some minimal level (e.g., MCS 5 or below), and the RB allocation is at or below some minimal level (e.g., 2 RBs). Here, the HPUE is able to determine locally that it is in region 4 and in need of more power to extend range.

If the HPUE is not in region 4 (step 306), the method 300 checks if $P_{CMAX}$ is greater than X dBm (step 308). If $P_{CMAX}$ is not greater than X dBm (step 308), the method 300 returns to step 306 and waits until it is determined that the HPUE is operating in region 4. Here, the HPUE is constrained to operate at the artificially lower $P_{CMAX}$, such as 23 dBm, until more power is needed solely for range extension. In regions designed for lower power UEs (i.e. with sufficient site density), it is expected that most HPUEs will operate at this point. If $P_{CMAX}$ is greater than X dBm (step 308) and the HPUE is not operating in region 4 (step 306), the method 300 decreases $P_{CMAX}$ by YdB (step 310), Y could be 1, 2, 3 or larger. Here, the method 300 determines that the HPUE is not in region 4, and backs off the $P_{CMAX}$ until it is at the value X dBm in incremental steps.

If the HPUE is operating in region 4 (step 306), the method 300 checks if $P_{CMAX}$ is equal to the maximum hardware capability of the HPUE (step 312). If the HPUE is operating at the maximum hardware capability (step 312), the method 300 returns to step 306 since there is no more adjustment available beyond the maximum hardware capability of the HPUE. If the HPUE is not operating at the maximum hardware capability (step 312), the method 300 increases $P_{CMAX}$ by YdB. Thus, the method 300 focuses increases/decreases in power of $P_{CMAX}$ in small increments with the increases constrained to the HPUE operating in region 4 and the decreases otherwise until the HPUE operates at a nominal value, e.g. 23 dBm.

FIG. 4 is a block diagram of a HPUE 400 apparatus for UE power class adaptation for coverage extension in LTE in accordance with some embodiments. The HPUE 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the HPUE 400 in an oversimplified manner, and a practical embodiment may include additional components and suitably configured processing logic to support known or conventional operating features that are not described in detail herein. The HPUE 400 can include, without limitation, a vehicular-based modem, a radio, a mobile device, an access terminal, a smart phone, a laptop, a tablet, or any other UE device.

The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the HPUE 400, a semiconductor-based microprocessor (in the form of a microchip or chip set), or generally any device for executing software instructions. When the HPUE 400 is in operation, the processor 402 is configured to execute software stored within the memory 410, to communicate data to and from the memory 410, and to generally control operations of the HPUE 400 pursuant to the software instructions. In an exemplary embodiment, the processor 402 may include a mobile optimized processor such as optimized for power consumption and mobile applications.

The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the HPUE 400. Additionally, the I/O interfaces 404 may further include an imaging device, i.e. camera, video camera, etc.

The radio 406 enables wireless communication to and/or from an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. Note, the radio 406 is configured to operate at different power class levels in LTE.

The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media. The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402.

The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the HPUE 400. For example, exemplary programs 416 may include, but not limited to, a web browser, social networking applications, streaming media applications, games, mapping and location applications, electronic mail applications, financial applications, and the like. In an exemplary embodiment, the O/S 414 and/or programs 416 can include instructions for implementing the method 300 of FIG. 3 or the method 500 of FIG. 5 to control the transmit power level of the radio 406.

Figure 5:
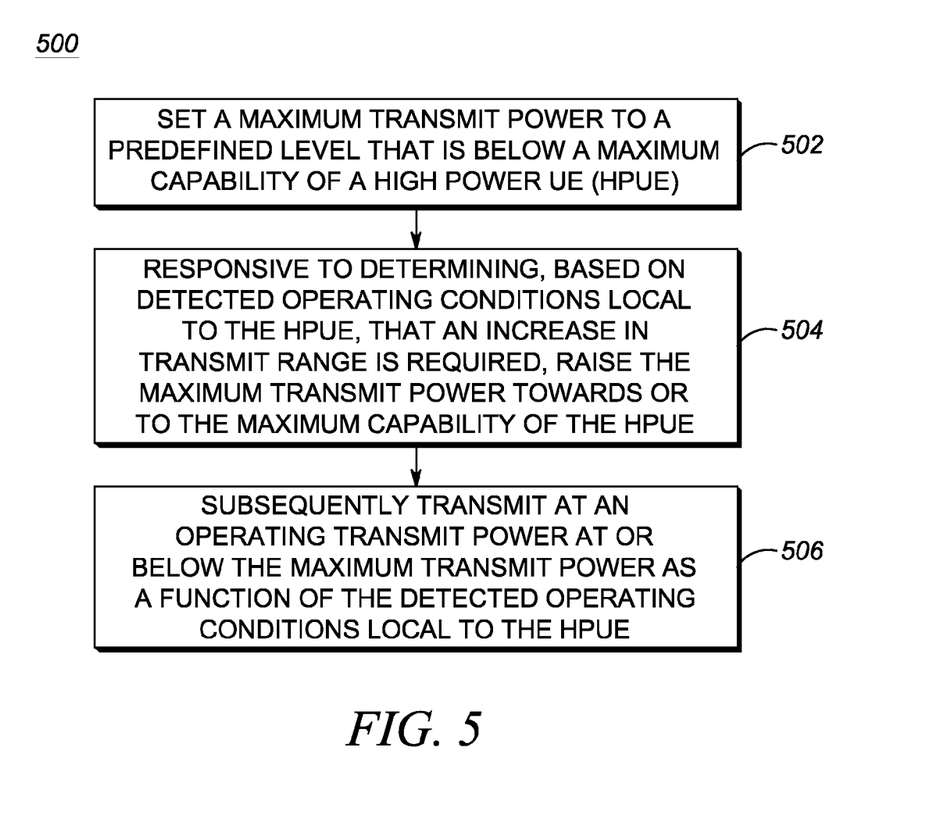
FIG. 5 is a flowchart of a method for UE power class adaptation for coverage extension in LTE in accordance with some embodiments.

FIG. 5 is a flowchart of a method 500 for User Equipment (UE) power class adaptation for coverage extension in Long Term Evolution (LTE) in accordance with some embodiments. The method 500 contemplates operation on an HPUE such as the HPUE 400 or the like. The method 500 includes setting a maximum transmit power to a predefined level that is below a maximum capability of a high power UE (HPUE) (step 502). In an exemplary embodiment, the maximum capability of the HPUE is 31 dBm corresponding to power class 1; and the predefined level is 23 dBm. For example, the method 500 is meant to inhibit the maximum capability of the HPUE except for range or coverage extension.

The method 500 includes, responsive to determining, based on detected operating conditions local to the HPUE, that an increase in transmit range is required, raising the maximum transmit power towards or to the maximum capability of the HPUE (step 504). Of note, the HPUE is locally deciding that the increase in transmit range is required, such as based on the open-loop power control behavior 200 described herein. Detecting the operating conditions can include detecting a block error rate, a power headroom report, a modulation and coding scheme allocation, and a resource block allocation. The determining that an increase in transmit range is required can be based on a minimal modulation and coding scheme, minimal resource block allocation, and a block error rate operating point.

The method 500 also includes subsequently transmitting at an operating transmit power at or below the maximum transmit power as a function of the detected operating conditions local to the HPUE (step 506). In this manner, the method 500 only uses the maximum capability of the HPUE when needed for range or coverage thereby enabling the HPUE to interoperate in cells with UEs designed for lower power classes. The method 500 can include performing the raising the maximum transmit power in incremental steps. The method 500 can include lowering the maximum transmit power in incremental steps to the predefined level responsive to determining that the increase in transmit range is no longer required. The raising the maximum transmit power can include raising the maximum transmit power to the maximum capability.

The method 500 can include reporting a power headroom to an Evolved Node B based on a current setting of the maximum transmit power. The method 500 can include determining operating conditions local to the HPUE based in part on scheduling data received from an Evolved Node B; and raising the maximum transmit power without assistance from the Evolved Node B thereby operating within existing 3rd Generation Partnership Project LTE systems. The method 500 can include further limiting the maximum transmit power based on power class capabilities of other UEs within a proximity of the HPUE.

In an exemplary embodiment, the methods 300, 500 can be operated considering the power class capabilities of other UEs within some proximity of the HPUE. For example, most existing UEs operate in 23 dBm power classes. In such scenarios, it is important to limit the HPUE to higher power operation (e.g., more than 23 dBm) solely for range or coverage extension. The power class capabilities of other UEs can be directly signaled to the HPUE via a signaling message from a serving eNB. Note, this information can be obtained in the determining operating conditions local to the HPUE. Also, the power class capabilities of other UEs can be indirectly indicated to the HPUE via a $P_{max}$ level broadcast from the serving eNB. For example, the power class capabilities of other UEs can be used to artificially limit the $P_{CMAX}$ in addition to the other mechanisms described herein.

Additionally, the method 500 contemplates operation in an apparatus such as the HPUE 400. The apparatus can include a radio configured to operate in a plurality of power classes; a processor communicatively coupled to the radio; and memory storing instructions that, when executed, cause the processor to: set a maximum transmit power to a predefined level that is below a maximum capability of the radio; responsive to determining, based on detected operating conditions local to the apparatus, that an increase in transmit range is required, raise the maximum transmit power towards or to the maximum capability of the radio; and subsequently transmit at an operating transmit power at or below the maximum transmit power as a function of the detected operating conditions local to the apparatus.

Further, the method 500 contemplates operation in an LTE system including an Evolved Node B (eNB); and a High power UE (HPUE) communicatively coupled to the eNB; wherein the HPUE is configured to: set a maximum transmit power to a predefined level that is below a maximum capability of the HPUE; responsive to determining, based on detected operating conditions local to the HPUE and with signaling information from the eNB, that an increase in transmit range is required, raise the maximum transmit power towards or to the maximum capability of the HPUE; and subsequently transmit at an operating transmit power at or below the maximum transmit power as a function of the detected operating conditions local to the HPUE without assistance from the eNB.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for High Power User Equipment (HPUE) power class adaptation for coverage extension in Long Term Evolution (LTE), the method comprising:

setting, by the HPUE, a variable maximum transmit power to an artificially low predefined level that is below a maximum capability of the HPUE;

transmitting, by the HPUE, at an operating transmit power at or below the variable maximum transmit power as a function of wireless conditions detected by the HPUE, and reporting, by the HPUE to a serving evolved node B (eNB), a first power headroom as a function of the variable maximum transmit power;

responsive to determining by the HPUE, as a function of wireless conditions detected by the HPUE, that an increase in HPUE wireless transmit range is required, raising, by the HPUE, the variable maximum transmit power towards or to the maximum capability of the HPUE;

transmitting, by the HPUE, at an operating transmit power at or below the raised variable maximum transmit power as a function of the detected wireless conditions and reporting, by the HPUE to the serving eNB, a second power headroom as a function of the raised variable maximum transmit power.

2. The method of claim 1, wherein detecting the wireless conditions comprises detecting a wireless block error rate, a wireless transmission power headroom report, a wireless modulation and coding scheme allocation, and a wireless resource block allocation.

3. The method of claim 1, wherein the determining that an increase in wireless transmit range is required is based on a minimal wireless modulation and coding scheme, minimal wireless resource block allocation, and a wireless block error rate operating point.

4. The method of claim 1, wherein the maximum capability of the HPUE is 31 dBm corresponding to power class 1; and
wherein the artificially low predefined level is 23 dBm.

5. The method of claim 1, further comprising:
performing the raising the variable maximum transmit power in incremental steps.

6. The method of claim 5, further comprising:
lowering the variable maximum transmit power in incremental steps to the artificially low predefined level responsive to determining that the increase in HPUE wireless transmit range is no longer required.

7. The method of claim 1, wherein raising the variable maximum transmit power comprises raising the variable maximum transmit power to the maximum capability of the HPUE.

8. The method of claim 1, further comprising:
determining wireless conditions by the HPUE based in part on scheduling data received from the eNB; and
raising the variable maximum transmit power without assistance from the eNB, thereby operating within existing 3rd Generation Partnership Project LTE systems.

9. The method of claim 1, further comprising:
further limiting the variable maximum transmit power based on power class capabilities of other UEs within a proximity of the HPUE.

10. A High Power User Equipment (HPUE) using power class adaptation for coverage extension in Long Term Evolution (LTE), the HPUE comprising:
a radio configured to operate in a plurality of power classes;
a processor communicatively coupled to the radio; and
memory storing instructions that, when executed, cause the processor to:
set a variable maximum transmit power of the radio to an artificially low predefined level that is below a maximum capability of the radio;
transmitting, via the radio, at an operating transmit power at or below the variable maximum transmit power as a function of wireless conditions detected by the HPUE, and reporting, by the HPUE to a serving evolved node B (eNB), a first power headroom as a function of the variable maximum transmit power;
responsive to determining, as a function of wireless conditions detected via the radio, that an increase in wireless transmit range of the radio is required, raise the variable maximum transmit power towards or to the maximum capability of the radio; and
transmit, via the radio, at an operating transmit power at or below the raised variable maximum transmit power as a function of detected wireless conditions and reporting, to the serving eNB, a second power headroom as a function of the raised maximum transmit power.

11. The HPUE of claim 10, wherein the wireless conditions comprise detecting a wireless block error rate, a wireless transmission power headroom report, a wireless modulation and coding scheme allocation, and a wireless resource block allocation.

12. The HPUE of claim 10, wherein the determining that an increase in wireless transmit range is required is based on a minimal wireless modulation and coding scheme, minimal wireless resource block allocation, and a wireless block error rate operating point.

13. The HPUE of claim 10, wherein the maximum capability of the radio is 31 dBm corresponding to power class 1; and
wherein the artificially low predefined level is 23 dBm.

14. The HPUE of claim 10, wherein the instructions, when executed, further cause the processor to:
perform the raising the variable maximum transmit power in incremental steps.

15. The HPUE of claim 14, wherein the instructions, when executed, further cause the processor to:
lower the variable maximum transmit power in the incremental steps to the artificially low predefined level responsive to determining radio transmit range extension is not needed.

16. The HPUE of claim 10, wherein the instructions, when executed, further cause the processor to:
determine wireless conditions via the radio based in part on scheduling data received from the eNB; and
raise the variable maximum transmit power of the radio without assistance from the eNB, thereby operating within existing 3rd Generation Partnership Project LTE systems.

17. A Long Term Evolution (LTE) system for High Power User Equipment (HPUE) using power class adaptation for coverage extension, the system comprising:
an Evolved Node B (eNB); and
an HPUE communicatively coupled to the eNB;
wherein the HPUE is configured to:
set a variable maximum transmit power to an artificially low predefined level that is below a maximum capability of the HPUE;
transmit, at an operating transmit power at or below the variable maximum transmit power as a function of wireless conditions detected by the HPUE, and report, by the HPUE to the eNB, a first power headroom as a function of the variable maximum transmit power;
responsive to determining, as a function of wireless conditions detected by the HPUE and with signaling information from the eNB, that an increase in wireless transmit range of the HPUE is required, raise the variable maximum transmit power towards or to the maximum capability of the HPUE; and transmit at an operating transmit power at or below the raised variable maximum transmit power as a function of detected wireless conditions and report, to the serving eNB, a second power headroom as a function of the raised maximum transmit power.

* * * * *

UNITED STATES PATENT AND TRADEMARK OFFICE
CERTIFICATE OF CORRECTION

PATENT NO. : 9,078,220 B2  
APPLICATION NO. : 14/039848  
DATED : July 7, 2015  
INVENTOR(S) : Isam R. Makhlouf et al.

Page 1 of 1

It is certified that error appears in the above-identified patent and that said Letters Patent is hereby corrected as shown below:

IN THE TITLE PAGE:

Item (71), under "Applicant," in Column 1, Line 1, delete "INC," and insert -- INC., --, therefor.

Item (72), under "Inventors," in Column 1, Line 1, delete "Isam R Makhlouf," and insert -- Isam R. Makhlouf, --, therefor.

Item (72), under "Inventors," in Column 1, Line 2, delete "Michael H Baker," and insert -- Michael H. Baker, --, therefor.

Item (72), under "Inventors," in Column 1, Line 3, delete "Edgar P Fernandes," and insert -- Edgar P. Fernandes, --, therefor.

IN THE SPECIFICATION:

In Column 1, Line 67, delete "embodiments" and insert -- embodiments. --, therefor.

In Column 2, Line 1, delete "open-loop" and insert -- an open-loop --, therefor.

In Column 2, Line 55, delete "apparatus" and insert -- apparatus. --, therefor.

In Column 3, Line 65, delete "a (j)•" and insert -- α (j)• --, therefor.

In Column 4, Line 25, delete "open-loop" and insert -- an open-loop --, therefor.

In Column 4, Line 51, delete "SNR" and insert -- SINR --, therefor.

In Column 7, Line 61, delete "(O/S)" and insert -- (OS) --, therefor.

In Column 8, Line 6, delete "O/S" and insert -- OS --, therefor.

Signed and Sealed this  
Fifth Day of July, 2016

Michelle K. Lee  
*Director of the United States Patent and Trademark Office*